(12) United States Patent
Niina et al.

(10) Patent No.: US 10,180,813 B2
(45) Date of Patent: Jan. 15, 2019

(54) PROCESSING DEVICE, IMAGE FORMING APPARATUS, AND IMAGE PROCESSING SYSTEM FOR RECEIVING, PERFORMING, AND OUTPUTTING A PROCESS

(71) Applicant: FUJI XEROX CO., LTD., Tokyo (JP)

(72) Inventors: Hiroshi Niina, Kanagawa (JP); Tetsuya Wakiyama, Kanagawa (JP); Masashi Okano, Kanagawa (JP); Junichi Shimizu, Kanagawa (JP); Kiyotaka Tsuchibuchi, Kanagawa (JP); Hiroshi Hayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/596,299

(22) Filed: May 16, 2017

(65) Prior Publication Data

US 2018/0059998 A1    Mar. 1, 2018

(30) Foreign Application Priority Data

Aug. 25, 2016  (JP) .................................. 2016-165040

(51) Int. Cl.
*G06F 15/00* (2006.01)
*G06F 3/12* (2006.01)
*G06K 1/00* (2006.01)
*H04N 1/00* (2006.01)
*H04N 1/32* (2006.01)

(52) U.S. Cl.
CPC .......... *G06F 3/1215* (2013.01); *G06F 3/1241* (2013.01); *G06F 3/1288* (2013.01); *H04N 1/00209* (2013.01); *H04N 1/00244* (2013.01); *H04N 1/00411* (2013.01); *H04N 1/00973* (2013.01); *H04N 1/32545* (2013.01); *H04N 2201/0039* (2013.01); *H04N 2201/0094* (2013.01)

(58) Field of Classification Search
CPC .... G06F 3/1215; G06F 3/1241; G06F 3/1288; H04N 1/00209; H04N 1/00244; H04N 1/00411
USPC .................. 358/1.1, 1.15, 1.9, 1.14, 1.13
See application file for complete search history.

(56) References Cited

U.S. PATENT DOCUMENTS

| 2012/0050796 | A1  | 3/2012 | Yokokura |
| 2016/0094634 | A1* | 3/2016 | Nosaki ................ H04L 67/1002 709/205 |
| 2018/0129454 | A1* | 5/2018 | Sako .................... G06F 3/1204 |

FOREIGN PATENT DOCUMENTS

JP          2012-053624 A       3/2012

* cited by examiner

*Primary Examiner* — Douglas Tran
(74) *Attorney, Agent, or Firm* — Oliff PLC

(57) ABSTRACT

A processing device includes a reception unit, a processing unit, and an output unit. The reception unit receives a process designated by a user. The processing unit performs the process received by the reception unit. The output unit outputs the process to an external apparatus capable of executing the process received by the reception unit. When the reception unit receives multiple processes, a process that is included in the multiple processes and in which an output from the processing device has to be obtained is performed in the processing device, and at least a part of a process that is included in the multiple processes and in which an output from the processing device does not have to be obtained is output to the external apparatus by the output unit.

7 Claims, 7 Drawing Sheets

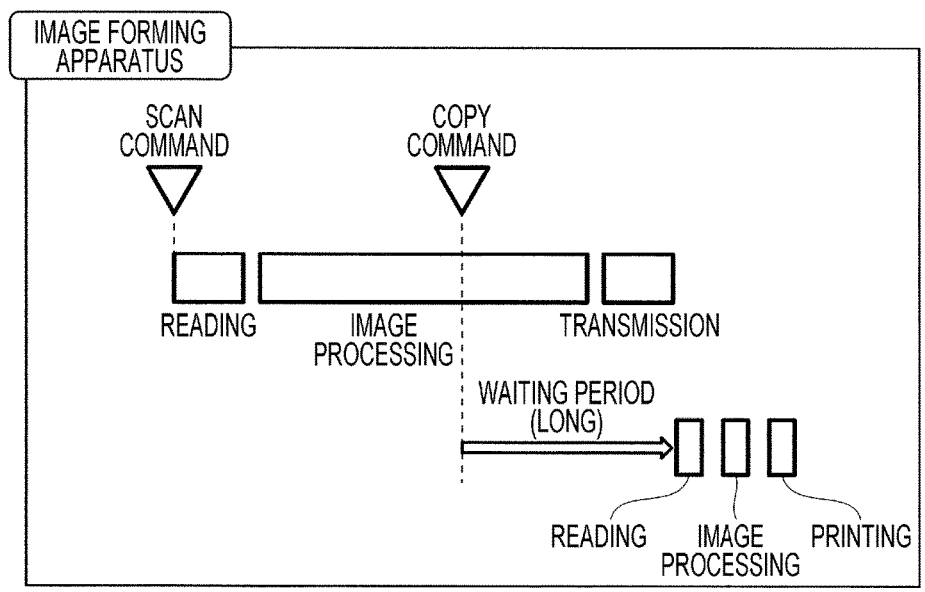
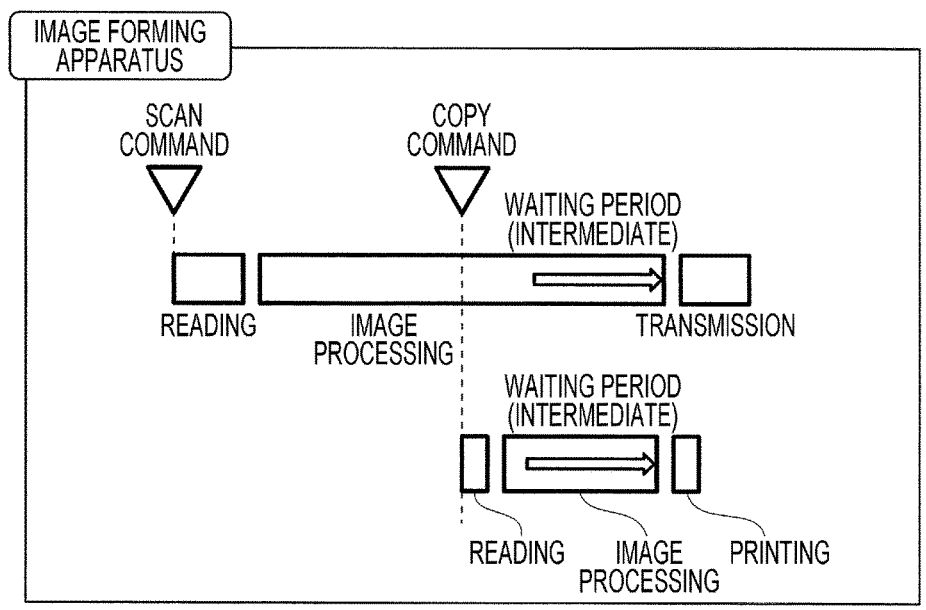

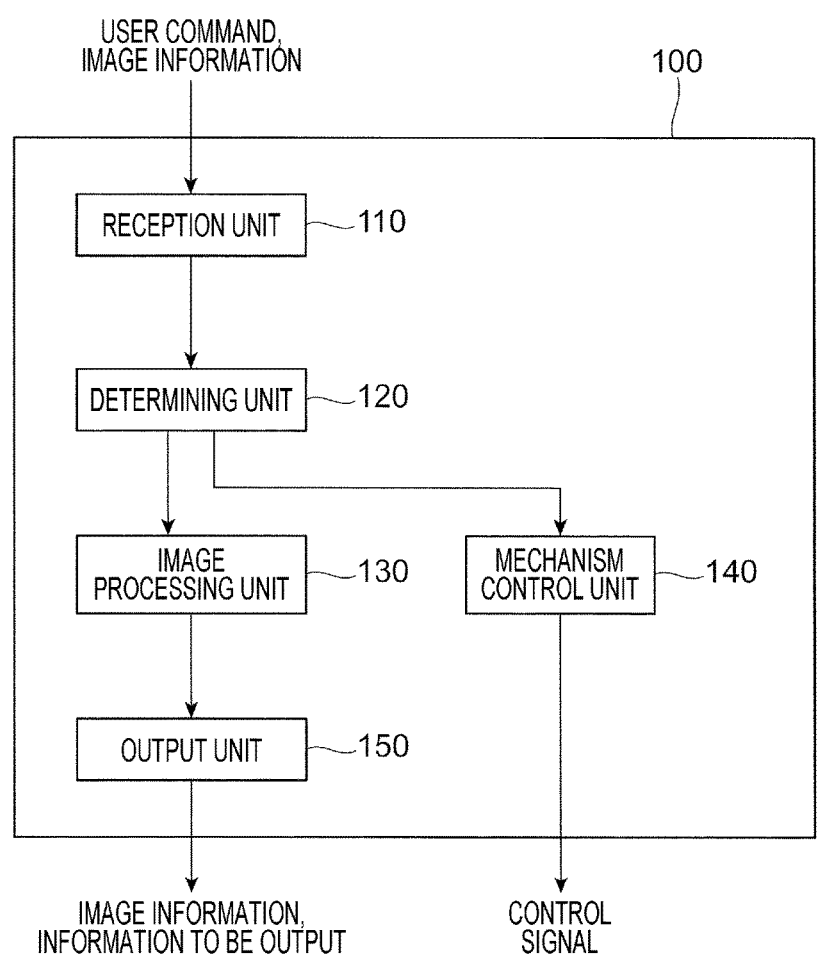

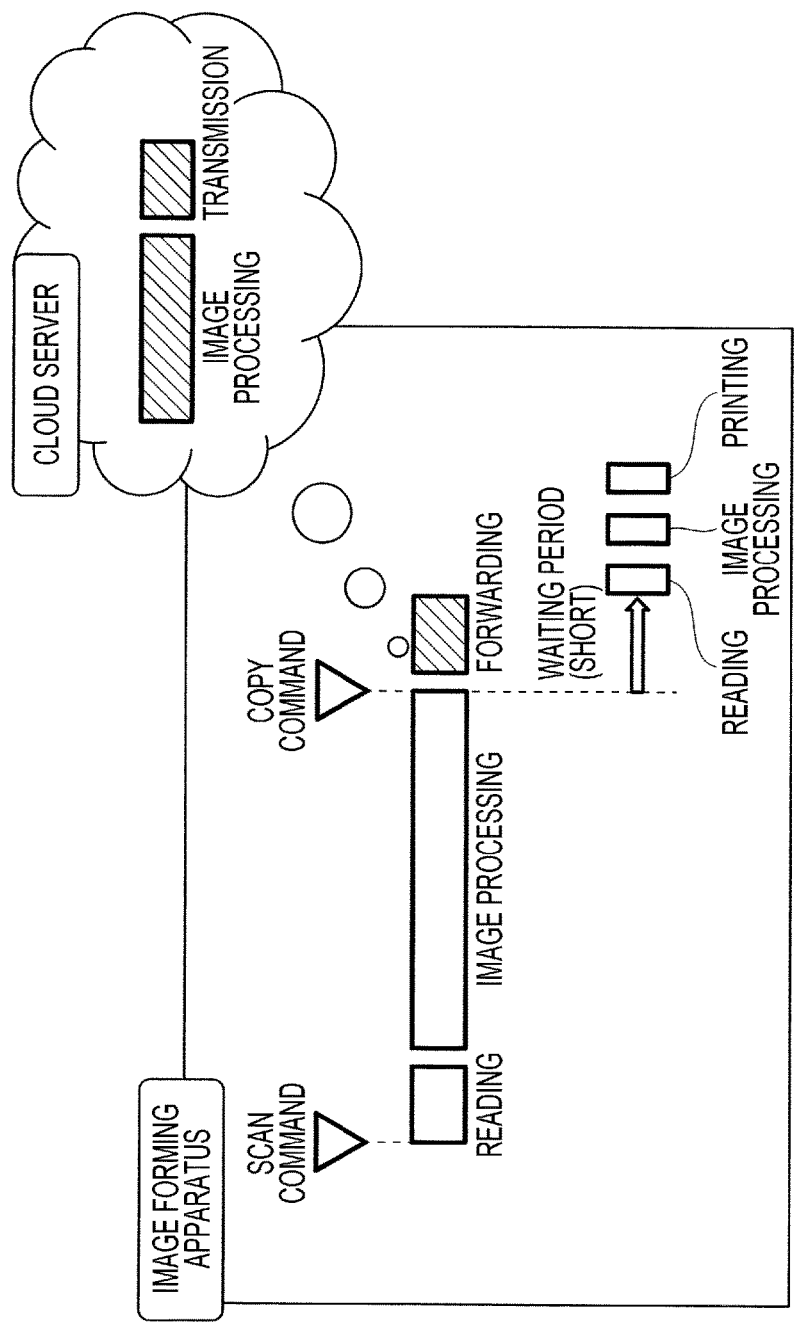

PROCESSING DEVICE, IMAGE FORMING APPARATUS, AND IMAGE PROCESSING SYSTEM FOR RECEIVING, PERFORMING, AND OUTPUTTING A PROCESS

CROSS-REFERENCE TO RELATED APPLICATIONS

This application is based on and claims priority under 35 USC 119 from Japanese Patent Application No. 2016-165040 filed Aug. 25, 2016.

BACKGROUND

TECHNICAL FIELD

The present invention relates to processing devices, image forming apparatuses, and image processing systems.

SUMMARY

According to an aspect of the invention, there is provided a processing device including a reception unit, a processing unit, and an output unit. The reception unit receives a process designated by a user. The processing unit performs the process received by the reception unit. The output unit outputs the process to an external apparatus capable of executing the process received by the reception unit. When the reception unit receives multiple processes, a process that is included in the multiple processes and in which an output from the processing device has to be obtained is performed in the processing device, and at least a part of a process that is included in the multiple processes and in which an output from the processing device does not have to be obtained is output to the external apparatus by the output unit.

BRIEF DESCRIPTION OF THE DRAWINGS

An exemplary embodiment of the present invention will be described in detail based on the following figures, wherein:

FIGS. 4A and 4B illustrate examples of operation performed in an image forming apparatus in the related art;

FIG. 5 is a block diagram illustrating an example of a functional configuration of a controller; and FIG. 6 illustrates an example of operation when a determining unit determines that a part of a process is to be output to an external apparatus.

DETAILED DESCRIPTION

Overall Configuration of Image Forming System

An exemplary embodiment of the present invention will be described in detail below with reference to the appended drawings.

Figure 1:
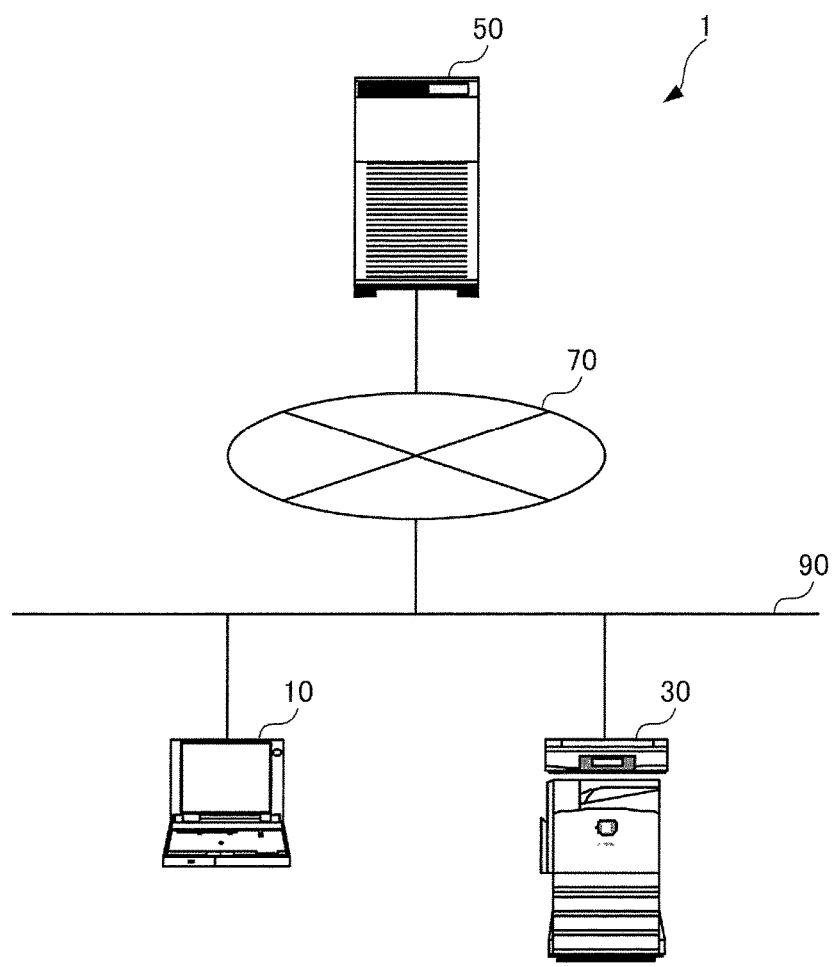
FIG. 1 illustrates the overall configuration of an image forming system according to an exemplary embodiment.

FIG. 1 illustrates the overall configuration of an image forming system 1 according to this exemplary embodiment.

As shown in FIG. 1, the image forming system 1 is configured by connecting a terminal apparatus 10 and an image forming apparatus 30 to a network 90. The network 90 is connected to, for example, a network 70 via a gateway server (not shown), and the network 70 is connected to a cloud server 50.

Although only a single terminal apparatus 10 is shown in FIG. 1, multiple terminal apparatuses 10 may be provided. Furthermore, although only a single image forming apparatus 30 is shown in FIG. 1, multiple image forming apparatuses 30 may be provided.

The terminal apparatus 10 is a computer that requests the image forming apparatus 30 to perform printing. The terminal apparatus 10 may be, for example, a personal computer (PC), a mobile terminal, or a mobile telephone.

The image forming apparatus 30 forms an image onto a recording medium, such as paper, and outputs the recording medium as a printed medium. The image forming apparatus 30 has a printing function and additionally has other image processing functions, such as a scanning function and a facsimile function.

The cloud server 50 is an example of an external apparatus and is a server computer that executes a part of a process to be performed in the image forming apparatus 30 on behalf thereof. This will be described in detail later.

The network 70 is a communication unit used for exchanging information between the terminal apparatus 10 and the cloud server 50 and also between the image forming apparatus 30 and the cloud server 50, and is, for example, the Internet.

The network 90 is a communication unit used for exchanging information between the terminal apparatus 10 and the image forming apparatus 30 and is, for example, a local area network (LAN).

Terminal Apparatus 10

Next, a hardware configuration of the terminal apparatus 10 will be described.

Figure 2:
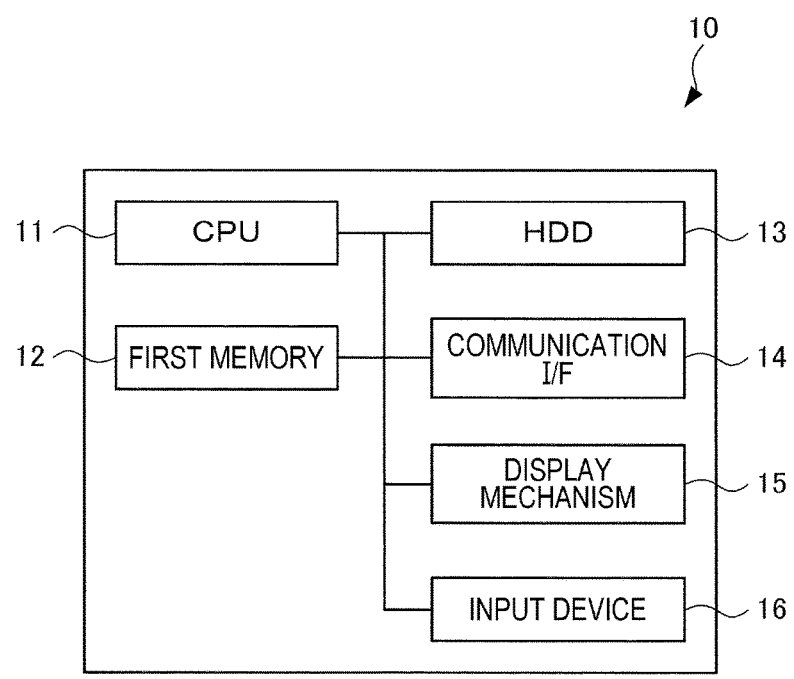
FIG. 2 illustrates a hardware configuration of a terminal apparatus.

FIG. 2 illustrates a hardware configuration of the terminal apparatus 10.

As shown in FIG. 2, the terminal apparatus 10 includes a central processing unit (CPU) 11 as an arithmetic unit, a first memory 12 as a memory unit, and a hard disk drive (HDD) 13 also as another memory unit. The CPU 11 executes various types of software, such as the operating system (OS) and applications. The first memory 12 is a memory region that stores the various types of software and data used for executing the software. The HDD 13 is a memory region that stores data to be input to the various types of software and data output from the various types of software.

Furthermore, the terminal apparatus 10 includes a communication interface (referred to as "communication I/F" hereinafter) 14 for communicating with an external unit, a display mechanism 15 formed of a video memory unit or a display, and an input device 16, such as a keyboard or a mouse.

FIG. 2 may also be regarded as a diagram that illustrates a hardware configuration of the cloud server 50.

Image Forming Apparatus 30

Figure 3:
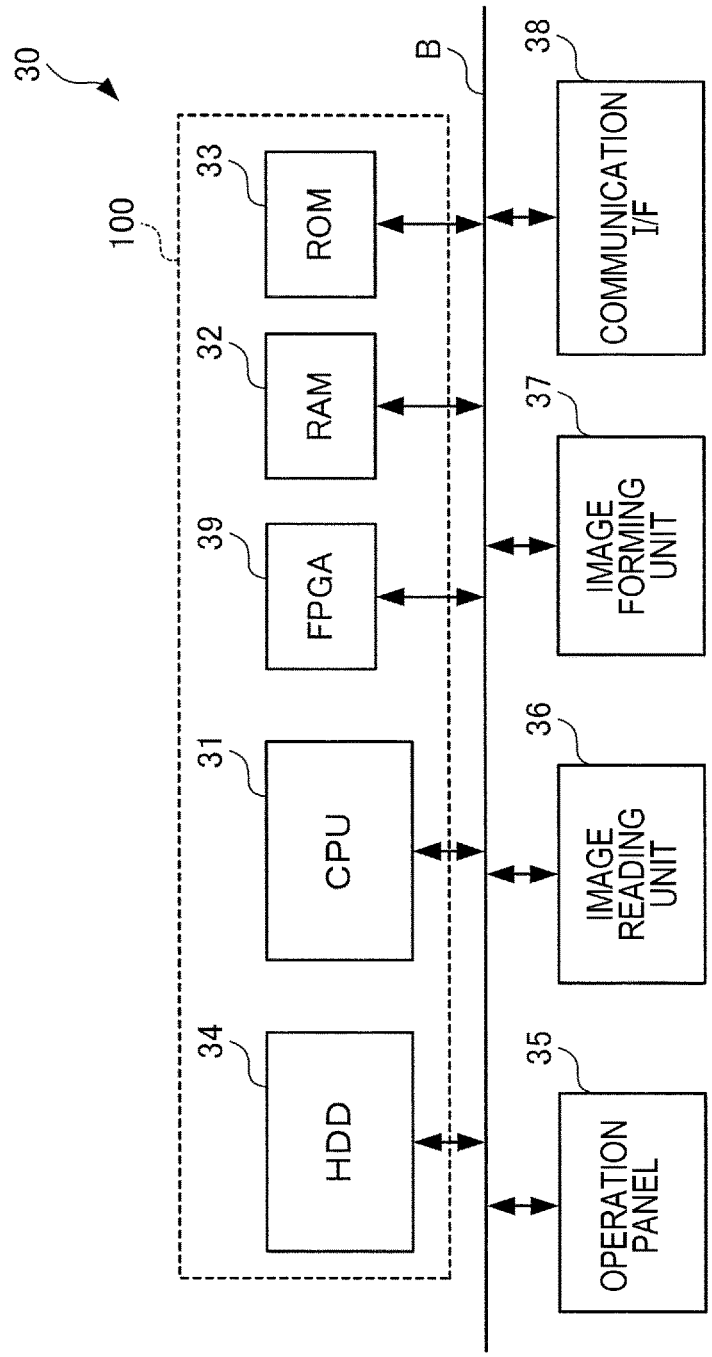
FIG. 3 illustrates an example of a hardware configuration of an image forming apparatus.

FIG. 3 illustrates an example of a hardware configuration of the image forming apparatus 30.

As shown in FIG. 3, the image forming apparatus 30 includes a CPU 31, a random access memory (RAM) 32, a read-only memory (ROM) 33, an HDD 34, an operation panel 35, an image reading unit 36, an image forming unit 37, a communication I/F 38, and a field-programmable gate array (FPGA) 39. These components exchange data with one another via a bus B.

The CPU 31 loads various types of programs stored in, for example, the ROM 33 to the RAM 32 and executes the programs so as to realize various functions to be described later.

The RAM 32 is a memory unit used as, for example, a working memory unit of the CPU 31.

The ROM 33 is a memory unit that stores various types of programs to be executed by the CPU 31.

The HDD 34 is, for example, a magnetic disk device that stores image information read by the image reading unit 36 and image information to be used for image formation in the image forming unit 37.

The operation panel 35 is, for example, a touchscreen that displays various types of information and that receives an operation input from a user.

The image reading unit 36 reads an image recorded on a document. The image reading unit 36 is, for example, a scanner and may be of a CCD type that uses a lens to reduce reflected light of light radiated onto the document from a light source and uses a charge coupled device (CCD) to receive the reflected light or may be of a CIS type that uses a contact image sensor (CIS) to receive reflected light of light sequentially radiated onto the document from a light-emitting-device (LED) light source.

The image forming unit 37 is an example of a printing mechanism that forms an image onto a recording medium. The image forming unit 37 is, for example, a printer and may be of an electrophotographic type that forms an image by transferring toner adhered to a photosensitive member onto a recording medium, such as paper, or may be of an inkjet type that forms an image by ejecting ink onto a recording medium.

The communication I/F 38 exchanges various types of information with other devices via a network.

The FPGA 39 is a type of custom large-scale integration (LSI). By changing the connections of wires in the FPGA 39, a logic circuit desired by the user may be freely formed. The FPGA 39 sequentially executes process units to be described later so as to perform image processing that accords with the purpose of operation of the image forming apparatus 30.

In this exemplary embodiment, the CPU 31, the RAM 32, the ROM 33, and the HDD 34 constitute a controller (processing device) 100 that controls, in the FPGA 39, the individual functional units of the image forming apparatus 30.

Operation of Image Forming Apparatus 30

The user may use such an image forming apparatus 30 to perform, for example, copying of a document. Specifically, the image forming unit 37 may form an image onto a recording medium based on image information of a document read by the image reading unit 36, thereby copying the document. Furthermore, the user may cause the terminal apparatus 10 to transmit a print job to the image forming apparatus 30 via the network 90 and the communication I/F 38 so as to perform printing. Specifically, the image forming unit 37 may form an image onto a recording medium based on image information included in the print job, thereby performing printing. Moreover, the user may send and receive facsimile. Specifically, image information of a document read by the image reading unit 36 may be transmitted via the networks 70 and 90 and the communication I/F 38. Alternatively, the user may scan a document. Specifically, image information of a document read by the image reading unit 36 may be stored into the terminal apparatus 10 via the network 90 and the communication I/F 38.

Furthermore, these multiple processes may be performed successively.

FIGS. 4A and 4B illustrate examples of operation performed in an image forming apparatus 30 in the related art. In FIGS. 4A and 4B, the length in the horizontal direction indicates the length of time.

FIGS. 4A and 4B illustrate a process performed in the image forming apparatus 30 when the user makes a scan command to the image forming apparatus 30 and then makes a copy command while scanning is being performed.

FIG. 4A illustrates a case where concurrent processing is not performed in response to the copy command and the scan command made by the user, whereas FIG. 4B illustrates a case where concurrent processing is performed.

As shown in FIGS. 4A and 4B, when the scan command is made by the user, the image reading unit 36 first reads an image of a document.

Then, image processing is performed by the controller 100. This image processing includes, for example, sample holding for sampling an R signal, a G signal, and a B signal, which are analog image signals output from a CCD, gain offset adjustment for adjusting the gain and offset with respect to the analog image signals, analog-to-digital conversion for converting the analog image signals into digital image signals, and shading correction for correcting the read density differences in the first scanning direction.

Furthermore, the image-processed image information is transmitted to an external unit (such as the terminal apparatus 10).

When the copy command is made by the user, the image reading unit 36 first reads the image of the document in a manner similar to that described above.

Then, the controller 100 performs image processing. This image processing includes, for example, skew correction for correcting the skew (tilt) of the document, color conversion for converting input image information into YMCK data, which are reproduction colors (i.e., the colors of toners serving as colorants, which are yellow (Y), magenta (M), cyan (C), and black (K)) of the image forming apparatus 30, color correction for adjusting a color change caused by a temporal change in the image forming unit 37, gradation correction for correcting the gradation of each of the YMCK colors, and error diffusion for converting the image information from multi-value image information (multi-value image data) expressed with multiple values to binary image information (binary image data) expressed with binary values.

Furthermore, the image forming unit 37 performs printing for forming the image onto a recording medium.

In this case, since concurrent processing is not performed by the controller 100 in FIG. 4A, the copying process starts after the scanning process is completed. In other words, there is a waiting period from when the user makes the copy command to when the copying process actually starts. In FIG. 4A, this waiting period is indicated by an arrow. In this case, the waiting period is long and is expressed as "waiting period (long)" in FIG. 4A.

In contrast, since the controller 100 performs concurrent processing in FIG. 4B, the copying process starts even while the scanning process is being performed. However, since the scanning process and the copying process are performed concurrently, the time point at which these processes end is later than in a case where these processes are performed singularly. Therefore, in this case, there is similarly a waiting period for each of the scanning process and the copying process. In FIG. 4B, these waiting periods are indicated by arrows. However, these waiting periods are shorter than in the case of FIG. 4A. Therefore, the waiting periods in FIG. 4B are each expressed as "waiting period (intermediate)".

The phenomenon of the long waiting period is more notable in the case where the FPGA 39 is used, as in this exemplary embodiment, than in a case where an application specific integrated circuit (ASIC) is used for performing the image processing. In other words, when using the ASIC, the image processing may often be performed by using the ASIC, meaning that there is a small load on the CPU. In contrast, when using the FPGA 39, the CPU is used concurrently with the FPGA 39 for performing the image processing, meaning that the load on the CPU tends to be large. As a result, the time spent for the image processing increases, resulting in a longer waiting period.

In this exemplary embodiment, the controller 100 is configured as follows so that the external apparatus performs at least a part of a process commanded by the user on behalf of the image forming apparatus 30, thereby minimizing the aforementioned problem.

Controller 100

FIG. 5 is a block diagram illustrating an example of a functional configuration of the controller 100. Of various functions of the controller 100, functions related to this exemplary embodiment are selectively illustrated in FIG. 5.

As shown in FIG. 5, the controller 100 according to this exemplary embodiment includes a reception unit 110 that performs reception of a process, a determining unit 120 that determines the contents of the process, an image processing unit 130 that performs image processing, a mechanism control unit 140 that controls the functional units of the image forming apparatus 30, and an output unit 150 that outputs image-processed image information and at least a part of the process to the external apparatus.

The reception unit 110 receives a process commanded by the user. Specifically, the reception unit 110 receives a scan command or a copy command made by the user, as mentioned above. Furthermore, the reception unit 110 receives image information that has not been image-processed yet. This image information is, for example, image information of a document read by the image reading unit 36. Moreover, this image information is, for example, image information included in a print job transmitted from the terminal apparatus 10.

The determining unit 120 determines the contents of a process to be actually performed in response to the command from the user. For example, as shown in FIGS. 4A and 4B, if the command from the user is a scan command, the determining unit 120 determines that reading, image processing, and transmission are to be performed. If the command from the user is a copy command, the determining unit 120 determines that reading, image processing, and printing are to be performed.

Furthermore, in this exemplary embodiment, the determining unit 120 determines whether the processes determined by the determining unit 120 are to be performed in the image forming apparatus 30 or in the external apparatus (i.e., the cloud server 50). Specifically, if there is one received process, the determining unit 120 determines that the process is to be performed in the image forming apparatus 30. If two or more (multiple) processes are received, as shown in FIGS. 4A and 4B, the processes determined by the determining unit 120 are distributed to the image forming apparatus 30 and the external apparatus.

Of the multiple processes, the determining unit 120 determines that a process in which an output from the image forming apparatus 30 has to be obtained is to be performed in the image forming apparatus 30. In this case, the image processing unit 130 and the mechanism control unit 140, which will be described later, perform this process.

For example, in the case of the copying process, an output of a printed material has to be obtained from the image forming apparatus 30. This may be regarded that, in the case of the copying process, an image has to be formed by the image forming unit 37. Therefore, in the case of the copying process, the determining unit 120 determines that all of the reading, image processing, and printing mentioned above are to be performed in the image forming apparatus 30. Another example of a process in which an output from the image forming apparatus 30 has to be obtained is a printing process. A printing process is also a process in which an output from the image forming apparatus 30 has to be obtained as a printed material.

In contrast, of the multiple processes, the determining unit 120 determines that at least a part of a process in which an output from the image forming apparatus 30 does not have to be obtained is to be output to the external apparatus from the output unit 150.

For example, in the case of the scanning process, it is not necessary to obtain an output of a printed material from the image forming apparatus 30. This may be regarded that, in the case of the scanning process, an image does not have to be formed by the image forming unit 37. Therefore, in the case of the scanning process, the determining unit 120 determines that one or more of the reading, image processing, and transmission mentioned above are to be performed in the external apparatus.

The image processing unit 130 performs image processing on the image information received by the reception unit 110 in accordance with the contents determined by the determining unit 120.

The mechanism control unit 140 outputs a control signal in accordance with the contents determined by the determining unit 120 so as to control each functional unit of the image forming apparatus 30.

For example, in the case of the scanning process, the mechanism control unit 140 controls the image reading unit 36 so as to perform a reading process for reading the image of the document. Moreover, the mechanism control unit 140 transmits the image information image-processed by the image processing unit 130 via the networks 70 and 90 and the communication I/F 38.

Furthermore, for example, in the case of the copying process, the mechanism control unit 140 controls the image reading unit 36 so as to perform a reading process for reading the image of the document. Moreover, the mechanism control unit 140 transmits the image information image-processed by the image processing unit 130 to the image forming unit 37 and controls the image forming unit 37 so as to perform printing.

In this exemplary embodiment, the image processing unit 130 and the mechanism control unit 140 function as a processing unit that performs a process received by the reception unit 110.

The output unit 150 outputs the image information image-processed by the image processing unit 130. Moreover, if the determining unit 120 determines that a part of a process is to be output to the external apparatus (i.e., the cloud server 50), the output unit 150 outputs (forwards) this process to the external apparatus (i.e., the cloud server 50) that is capable executing this process. Examples of information to be output in this case include image data, process instructions, intrinsic parameters of the process, authentication data of the cloud server 50, an email address, a progress notification command, transmission-source information, and a process-result notification destination.

In this case, the cloud server 50 performs the part of the forwarded process on behalf of the image forming apparatus 30.

FIG. 6 illustrates an example of operation when the determining unit 120 determines that a part of a process is to be output to the external apparatus. In FIG. 6, the length in the horizontal direction indicates the length of time.

Similar to the case of FIGS. 4A and 4B, FIG. 6 illustrates a process performed in the image forming apparatus 30 when the user makes a scan command to the image forming apparatus 30 and then makes a copy command while scanning is being performed.

When the copy command is received from the user, image processing in the scanning process is being performed in accordance with the scan command. In this case, the determining unit 120 determines that image processing upon reception of the copy command and transmission are to be performed in the cloud server 50 serving as the external apparatus. Then, the output unit 150 forwards these processes to the cloud server 50. The cloud server 50 performs a part of the image processing and the transmission on behalf of the image forming apparatus 30.

In this case, a waiting period from when the user makes the copy command to when the copying process actually starts corresponds to a time period in which the forwarding process is performed. This waiting period is shorter than in the case of FIG. 4A or 4B and is expressed as "waiting period (short)" in FIG. 6.

In this case, when a first process (i.e., scanning process) received first among multiple processes is a process in which an output from the image forming apparatus 30 does not have to be obtained and a second process (i.e., copying process) received while the processing unit (i.e., the image processing unit 130 and the mechanism control unit 140) is performing the first process (i.e., scanning process) is a process in which an output from the image forming apparatus 30 has to be obtained, it may be regarded that at least a part of the first process (i.e., scanning process) is output to the external apparatus (i.e., the cloud server 50) by the output unit 150.

Figure 7:
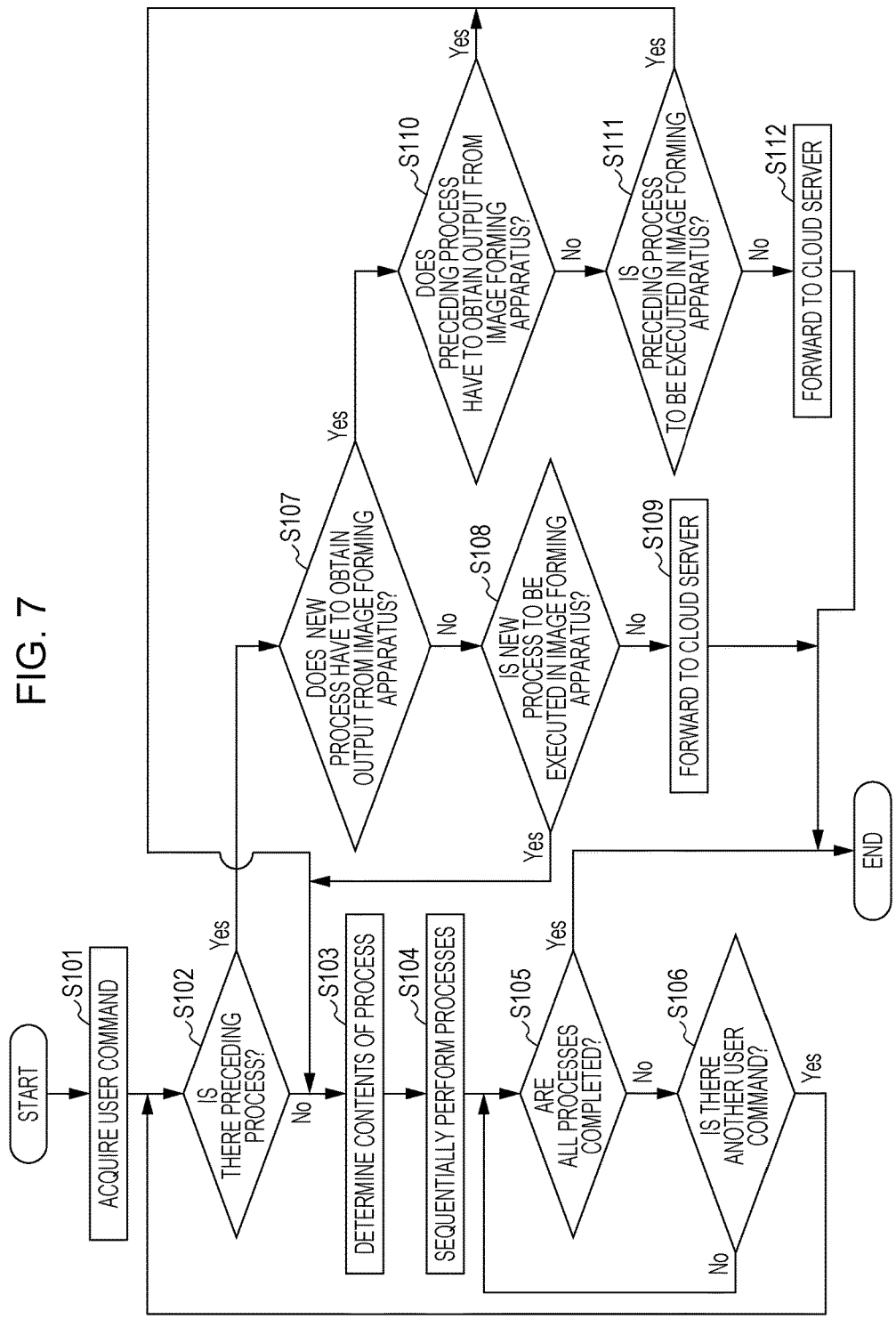
FIG. 7 is a flowchart illustrating the operation of the controller.

FIG. 7 is a flowchart illustrating the operation of the controller 100.

The operation of the controller 100 will be described below with reference to FIGS. 5 to 7.

First, the user inputs a user command by operating the operation panel 35. In the case of FIG. 6, the user sets a document on the image reading unit 36 and makes a scan command via the operation panel 35. This user command is acquired by the reception unit 110 in step S101.

Then, in step S102, the determining unit 120 determines whether or not a preceding process is being performed.

If a preceding process is not being performed (No in step S102), the determining unit 120 determines the contents of a process to be actually performed in response to the user command in step S103. In the case of FIG. 6, since a preceding process is not being performed when the scan command is made, a result of "No" is obtained in step S102, and the determining unit 120 determines that reading, image processing, and transmission are to be performed.

Then, in step S104, the processes determined by the determining unit 120 are sequentially performed.

In the case of FIG. 6, since the user command is a scan command, the mechanism control unit 140 controls the image reading unit 36 so as to read the image of the document. Furthermore, the reception unit 110 acquires the image information from the image reading unit 36, and the image processing unit 130 performs image processing.

Subsequently, in step S105, the determining unit 120 determines whether or not all of the determined processes are completed.

If all of the determined processes are completed (Yes in step S105), the sequential operation ends.

In contrast, if all of the determined processes are not completed (No in step S105), the reception unit 110 determines in step S106 whether or not another user command is made.

If there is no more user command (No in step S106), the operation returns to step S105.

In contrast, if there is a user command (Yes in step S106), the operation returns to step S102. The following description relates to a case where the user command in this case is a copy command made during image processing in the scanning process, as shown in FIG. 6.

In this case, since the scanning process is already being performed in step S102, a preceding process is being performed (Yes in step S102).

In this case, the determining unit 120 determines in step S107 whether or not a new process according to the user command is a process in which an output from the image forming apparatus 30 has to be obtained.

If the new process is a process in which an output from the image forming apparatus 30 does not have to be obtained (No in step S107), the determining unit 120 determines in step S108 whether or not the new process is to be executed in the image forming apparatus 30. In this case, for example, the determining unit 120 performs the determination based on a time period estimated from the contents of the new process. Specifically, if the new process does not consume much time, the determining unit 120 determines that the new process is to be executed in the image forming apparatus 30. In contrast, if the new process consumes a long period of time, the determining unit 120 determines that the new process is not to be executed in the image forming apparatus 30 but to be executed in the cloud server 50. In other words, among multiple processes, a process in which an output from the image forming apparatus 30 does not have to be obtained is still performed in the image forming apparatus 30 instead of being output to the external apparatus (i.e., the cloud server 50) if the process satisfies a predetermined condition.

If the determining unit 120 determines that the new process is to be executed in the image forming apparatus 30 (Yes in step S108), the operation transfers to step S103.

In contrast, if the determining unit 120 determines that the new process is not to be executed in the image forming apparatus 30 (No in step S108), the output unit 150 forwards the contents of the new process to the cloud server 50 via, for example, the communication I/F 38 in step S109. The cloud server 50 performs the new process on behalf of the image forming apparatus 30.

If it is determined in step S107 that the new process according to the user command is a process in which an output from the image forming apparatus 30 has to be obtained (Yes in step S107), the determining unit 120 determines in step S110 whether or not the preceding process is a process in which an output from the image forming apparatus 30 has to be obtained. The copying process shown in FIG. 6 corresponds to this case since it is a process in which an output from the image forming apparatus 30 has to be obtained.

If the preceding process is a process in which an output from the image forming apparatus 30 has to be obtained (Yes in step S110), the operation transfers to step S103.

In contrast, if the preceding process is a process in which an output from the image forming apparatus 30 does not have to be obtained (No in step S110), the determining unit 120 determines in step S111 whether or not the preceding process is to be executed in the image forming apparatus 30. In this case, the determining unit 120 performs the determination based on a time period estimated from the contents of the preceding process, as in the above-described case.

Then, if the determining unit 120 determines that the preceding process is to be executed in the image forming apparatus 30 (Yes in step S111), the operation transfers to step S103.

In contrast, if the determining unit 120 determines that the preceding process is not to be executed in the image forming apparatus 30 (No in step S111), the output unit 150 forwards the contents of the new process to the cloud server 50 via, for example, the communication I/F 38 in step S112. The cloud server 50 performs the preceding process on behalf of the image forming apparatus 30. FIG. 6 corresponds to this case in which the output unit 150 forwards the image processing upon reception of the copy command and the transmission to the cloud server 50. The cloud server 50 performs a part of the image processing and the transmission on behalf of the image forming apparatus 30.

According to the exemplary embodiment described in detail above, when performing processing in the processing device of, for example, the image forming apparatus 30, the waiting period is unlikely to be long even when multiple processes are performed. In particular, the waiting period for a process, such as printing, which involves an output from the image forming apparatus 30, may be reduced.

Although the user makes commands for multiple processes with time lags in the above-described example, at least two of the multiple processes may be performed concurrently.

Furthermore, in the above-described example, the cloud server 50 serves as the external apparatus that receives a part of a process forwarded from the image forming apparatus 30. Alternatively, for example, a server computer connected to the network 90, such as a LAN, instead of the network 70, such as the Internet, may serve as the external apparatus. As another alternative, the terminal apparatus 10 may serve as the external apparatus.

Moreover, in the above-described example, the controller 100 that controls the image forming apparatus 30 is described as an example of the processing device. Alternatively, the processing device according to this exemplary embodiment is applicable to any device so long as the device receives and executes multiple processes.

Program

A process to be performed by the controller 100 is realized by a software resource and a hardware resource operating in cooperation with each other.

Thus, a process to be performed by the controller 100 may be regarded as a program causing a computer to have a receiving function that receives a process designated by a user, a processing function that performs the process received by the receiving function, and an output function that outputs the process to an external apparatus (i.e., the cloud server 50) capable of executing the process received by the receiving function. When the receiving function receives multiple processes, a process that is included in the multiple processes and in which an output from the image forming apparatus 30 has to be obtained is processed in the image forming apparatus 30 by the processing function, and at least a part of a process that is included in the multiple processes and in which an output from the image forming apparatus 30 does not have to be obtained is output to the external apparatus by the output function.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing device comprising:
 a processor and memory configured to:
  receive processes, which include image processing performed on image information;
  perform the processes; and
  output the processes to an external apparatus, wherein:
 at least a first part of the processes, which requires an output from the processing device, is performed in the processing device, and
 at least a second part of the processes, which does not require an output from the processing device, is output to the external apparatus.

2. The processing device according to claim 1,
 wherein, when a first process received first among the processes does not require an output from the processing device and a second process of the processes received while the processor is performing the first process requires an output from the processing device, at least a part of the first process is output to the external apparatus.

3. The processing device according to claim 1,
 wherein the second part of the processes that does not require an output of the processing device is performed in the processing device without being output to the external apparatus if the second part satisfies a predetermined condition.

4. The processing device according to claim 1,
 wherein the first part of the processes that requires an output from the processing device is a copying process or a printing process.

5. The processing device according to claim 1,
 wherein the second part of the processes that does not require an output from the processing device is a scanning process.

6. An image forming apparatus comprising:
 a printer; and
 a controller
 that:
  receives processes, which include image processing performed on image information;
  performs the processes; and
  outputs the processes to an external apparatus wherein:
 at least a first part of the processes, which requires an image to be formed at the printer, is performed in the image forming apparatus, and
 at least a second part of the processes, which does not require an image to be formed at the printer, is output to the external apparatus.

7. An image processing system comprising:
a processing device; and
an external apparatus, wherein:
the processing device includes a processor configured to:
- receive processes, which include image processing performed on image information;
- perform the processes; and
- output the processes to the external apparatus, wherein:

at least a first part of the processes, which requires an output from the processing device, is performed in the processing device, and at least a second part of the processes, which does not require an output from the processing device, is output to the external apparatus.

* * * * *